US012617220B2

(12) United States Patent
Tokita et al.

(10) Patent No.: US 12,617,220 B2
(45) Date of Patent: May 5, 2026

(54) DRYING DEVICE, PRINTING APPARATUS, AND CONTROL METHOD THEREOF

(71) Applicant: CANON KABUSHIKI KAISHA, Tokyo (JP)

(72) Inventors: Toshinobu Tokita, Kanagawa (JP); Yoshikazu Abe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 133 days.

(21) Appl. No.: 18/600,454

(22) Filed: Mar. 8, 2024

(65) Prior Publication Data

US 2024/0308247 A1 Sep. 19, 2024

(30) Foreign Application Priority Data

Mar. 14, 2023 (JP) ................................ 2023-039883

(51) Int. Cl.

*B41J 11/00* (2006.01)
*B41J 2/17* (2006.01)
*F26B 3/04* (2006.01)
*F26B 13/10* (2006.01)
*F26B 21/04* (2006.01)

(Continued)

(52) U.S. Cl.

CPC ....... *B41J 11/00222* (2021.01); *B41J 2/1714* (2013.01); *B41J 11/0022* (2021.01); *B41J 11/00224* (2021.01); *F26B 3/04* (2013.01); *F26B 13/108* (2013.01); *F26B 21/04* (2013.01); *F26B 21/10* (2013.01); *F26B 21/12* (2013.01);

(Continued)

(58) Field of Classification Search

CPC ................ B41J 11/00222; B41J 2/1714; B41J 11/0022; B41J 11/00224; B41J 11/0024; B41J 11/00242; B41J 11/00244; F26B 3/04; F26B 13/108; F26B 21/04; F26B 21/10; F26B 21/12

See application file for complete search history.

(56) References Cited

U.S. PATENT DOCUMENTS 5,020,244 A 6/1991 Smith
9,302,502 B2 4/2016 Sasaki (Continued)

FOREIGN PATENT DOCUMENTS

JP 2009034931 A 2/2009
JP 2013029268 A 2/2013

(Continued)

*Primary Examiner* — Henok D Legesse
(74) *Attorney, Agent, or Firm* — Canon U.S.A., Inc. IP Division

(57) ABSTRACT

A drying device includes a conveying unit, a hot air blowing unit, a passage forming unit, and an adjusting unit. The conveying unit conveys a medium to which a liquid is discharged from a discharging head. The hot air blowing unit includes a blowing unit that blows air, and a heating unit that heats air. The passage forming unit forms, between the hot air blowing unit and a region on a conveying unit conveyance path, a circulation path through which air blown from the hot air blowing unit is circulated. The adjusting unit adjusts a ratio between inside air circulating through the circulation path and outside air that is introduced into the circulation path. If a temperature increase condition is established, the adjusting unit increases a ratio of the inside air. If a temperature decrease condition is established, the adjusting unit increases a ratio of the outside air.

15 Claims, 11 Drawing Sheets

(51) Int. Cl.
*F26B 21/10* (2006.01)
*F26B 21/12* (2006.01)

(52) U.S. Cl.
CPC ....... *B41J 11/0024* (2021.01); *B41J 11/00242* (2021.01); *B41J 11/00244* (2021.01)

(56) References Cited

U.S. PATENT DOCUMENTS

| | | | | |
|---|---|---|---|---|
| 2011/0063358 | A1* | 3/2011 | Muro | B41J 29/377 347/17 |
| 2011/0261102 | A1* | 10/2011 | Kurasawa | B41J 11/0022 347/17 |
| 2015/0174924 | A1* | 6/2015 | Fuchioka | B41J 11/00222 347/102 |
| 2016/0355027 | A1* | 12/2016 | Valero Navazo | B41J 11/0022 |
| 2018/0222214 | A1 | 8/2018 | Llorach To | |
| 2019/0283463 | A1 | 9/2019 | Nishimura | |
| 2020/0307186 | A1* | 10/2020 | Asamoto | B41J 2/0451 |
| 2021/0146704 | A1 | 5/2021 | Yoda | |
| 2022/0402278 | A1 | 12/2022 | Maida | |
| 2022/0402281 | A1 | 12/2022 | Maida | |

FOREIGN PATENT DOCUMENTS

| | | | |
|---|---|---|---|
| JP | 2016087926 | A | 5/2016 |
| JP | 2018008475 | A | 1/2018 |

* cited by examiner

DRYING DEVICE, PRINTING APPARATUS, AND CONTROL METHOD THEREOF

BACKGROUND

Field

The present disclosure relates to a drying device, a printing apparatus, and a control method thereof.

Description of the Related Art

As a technique of drying a liquid on a medium such as paper, there is known a technique of promoting drying of a liquid by blowing hot air to a medium. For example, U.S. Patent App. Pub. No. 2018/0222214 discloses a technique of discharging emulsion ink to a medium and then drying the emulsion ink using hot air to fix it to the medium. U.S. Patent App. Pub. No. 2018/0222214 also discloses a technique of circulating hot air. By circulating hot air, power of a heater that heats air can be saved.

When a drying device is turned on, time is taken until inside air circulating in the device reaches a predetermined temperature. A long turn-on time hinders a quick shift to drying work, so the conventional technique has room for improvement in shortening the temperature increase time of inside air. When the user works on the drying device for replacement of a medium or error handling, the workability of the user can be improved by decreasing the temperature of hot air. However, if the decrease of the temperature of hot air takes time, the workability of the user is impaired. The conventional technique also has room for improvement in shortening the temperature decrease time of inside air.

SUMMARY

The present disclosure provides a technique of adjusting the temperature of inside air of a drying device in a shorter time.

According to an aspect of the present disclosure, a drying device includes a conveying unit configured to convey a medium to which a liquid is discharged from a discharging head, a hot air blowing unit including a blowing unit configured to blow air, and a heating unit configured to heat air, a passage forming unit configured to form, between the hot air blowing unit and a region on a conveyance path of the conveying unit, a circulation path through which air blown from the hot air blowing unit is to be circulated, an adjusting unit configured to adjust a ratio between inside air circulating through the circulation path and outside air, outside the circulation path, that is introduced into the circulation path, and a control unit configured to control the adjusting unit, wherein, if a temperature increase condition is established, the control unit controls the adjusting unit to increase a ratio of the inside air, and if a temperature decrease condition is established, the control unit controls the adjusting unit to increase a ratio of the outside air.

Further features of the present disclosure will become apparent from the following description of exemplary embodiments (with reference to the attached drawings).

DESCRIPTION OF THE EMBODIMENTS

Figure 1:
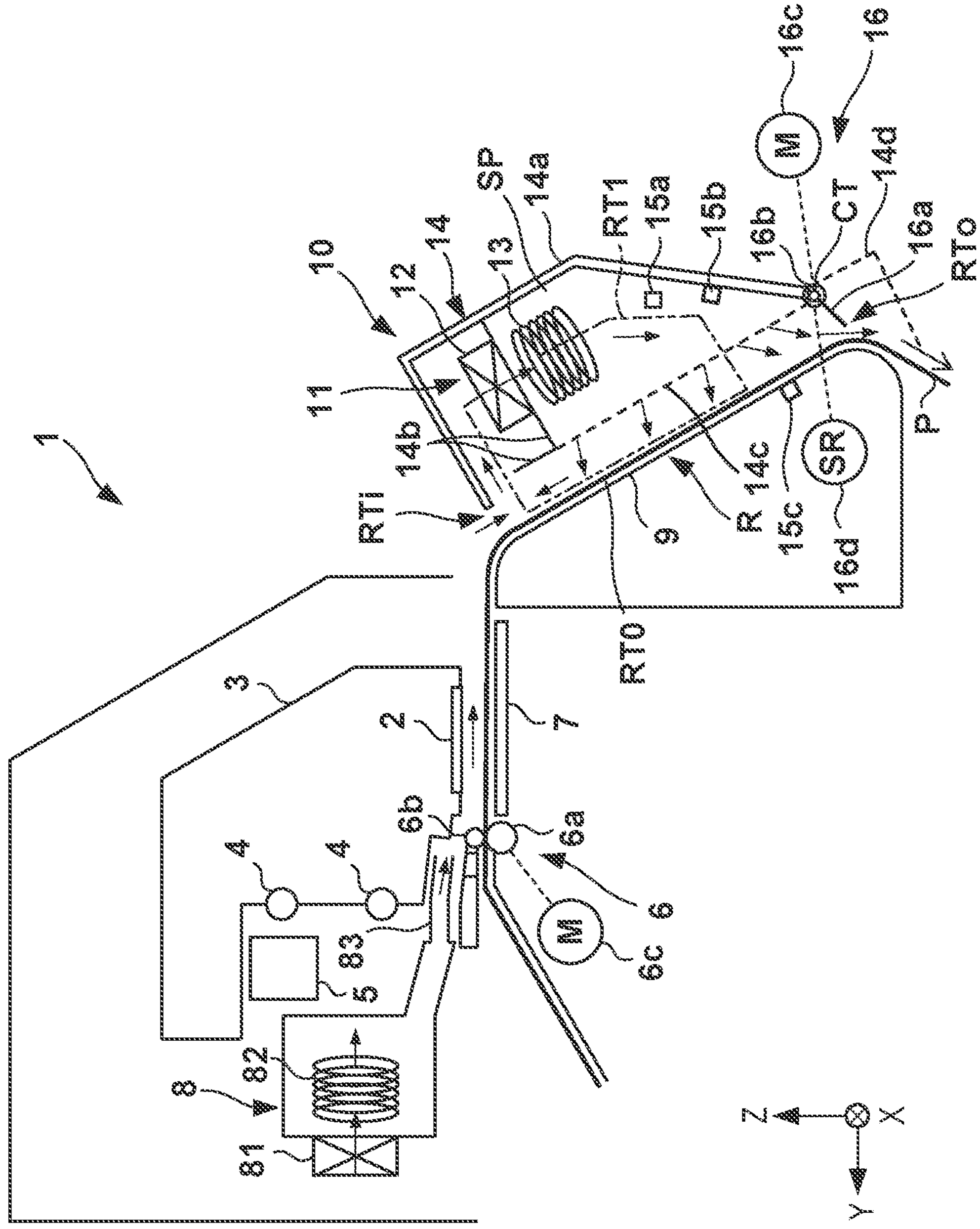
FIG. 1 is a schematic view of a printing apparatus according to an embodiment of the present disclosure.

Hereinafter, embodiments will be described in detail with reference to the attached drawings. Note, the following embodiments are not intended to limit the scope of the claimed disclosure. Multiple features are described in the embodiments, but limitation is not made to an disclosure that requires all such features, and multiple such features may be combined as appropriate. Furthermore, in the attached drawings, the same reference numerals are given to the same or similar configurations, and redundant description thereof is omitted.

<Printing Apparatus>

FIG. 1 is a schematic view of a liquid discharge apparatus 1 according to an embodiment of the present disclosure. The liquid discharge apparatus 1 according to the embodiment is an inkjet printing apparatus that prints by discharging liquid ink to a printing medium. However, the present disclosure is applicable to even printing apparatuses and liquid discharge apparatuses of other types. In FIG. 1, arrows X and Y indicate horizontal directions crossing each other, and an arrow Z indicates a vertical direction. In the embodiment, the X and Y directions are perpendicular to each other.

Note that "printing" not only includes the formation of significant information such as characters and graphics, but also broadly includes the formation of images, figures, patterns, and the like on a printing medium, or the processing of the medium, regardless of whether they are significant or insignificant, and regardless of whether they are so visualized as to be visually perceivable by humans. In addition, "printing medium" can be paper, cloth, a plastic film, or the like. More specifically, "printing medium" can be an ink absorbing medium such as paper, or an ink unabsorbing medium such as vinyl chloride. A discharged ink is assumed to be emulsion ink, but can be another type of ink.

The printing apparatus 1 includes a conveying unit 6 that conveys a printing medium P. The conveying unit 6 includes a driving roller 6*a* that rotates by the driving force of a motor 6*c*, and a driven roller 6*b* that contacts the driving roller 6*a* under pressure. The printing medium P is a sheet medium, and supply and discharging of a sheet medium adopt a so-called roll-to-roll method of winding a sheet medium around rollers (not shown) different before and after printing. However, a cut sheet may be used as the printing medium P.

The conveying unit 6 conveys the printing medium P in the Y direction (−Y direction). The driving roller 6*a* is a roller extending in the X direction. A platen 7 and a discharging head 2 facing the platen 7 are provided on the downstream side of the conveying unit 6 in the conveyance direction of the printing medium P. The printing medium P is conveyed between the platen 7 and the discharging head 2.

The discharging head 2 is a printhead that discharges ink to the printing medium P on the platen 7. A carriage 3 supports the discharging head 2. The carriage 3 is guided by a guide 4 extending in the X direction and reciprocated in the X direction by a driving mechanism 5. The driving mechanism 5 is, for example, a belt transmission mechanism that includes an endless belt freely travelable in the X direction and uses a motor as a driving source. The carriage 3 is fixed to the endless belt.

The printing apparatus 1 according to the embodiment is a serial type printing apparatus in which the discharging head 2 is mounted on the carriage 3. Printing control is performed on the printing medium P by alternately repeating a conveyance operation (intermittent conveyance operation) of conveying the printing medium P by a predetermined amount by the conveying unit 6, and a printing operation during the stop of conveyance of the conveying unit 6. The printing operation is an operation of discharging ink from the discharging head 2 while moving the carriage 3 supporting the discharging head 2. The platen 7 may include a suction mechanism of sucking the printing medium P, and in the printing operation, may suck the printing medium P to prevent floating of the printing medium P. Note that the printing apparatus 1 may be a full-line type printing apparatus in which the discharging head 2 extends in the X direction without providing the carriage 3.

Next, an arrangement for drying ink discharged to the printing medium P and fixing it to the printing medium P will be explained. A hot air blowing device 8 is provided at a position upstream of the discharging head 2 in the conveyance direction of the printing medium P. The hot air blowing device 8 includes a blowing unit 81 that blows air, and a heating unit 82 that heats the air blown from the blowing unit 81. The hot air blowing device 8 blows hot air toward a region (surface of the printing medium P) between the platen 7 and the discharging head 2. This promotes evaporation of water contained in ink discharged to the surface of the printing medium P on the platen 7, and promotes drying of the ink and fixation to the printing medium P. In the embodiment, the blowing unit 81 is an electric fan, and the heating unit 82 is a coil type electrothermal transducer. However, the blowing mechanism of the blowing unit 81 and the heat source of the heating unit 82 are not limited to them.

A drying device 10 is provided at a position downstream of the discharging head 2 in the conveyance direction of the printing medium P. The drying device 10 according to the embodiment shares the conveying unit 6 as the conveying mechanism of the printing medium P with the printing mechanism (discharging head 2, carriage 3, and the like), and is arranged at a position where the drying device 10 faces a guide unit 9 configured to guide conveyance of the printing medium P. The guide unit 9 guides the printing medium P obliquely downward. The drying device 10 is a fixing device that promotes drying of ink and fixation to the printing medium P by blowing hot air to the printing medium P that bears ink discharged from the discharging head 2 and is conveyed on the guide unit 9.

The drying device 10 includes a hot air blowing unit 11 and a passage forming unit 14. The hot air blowing unit 11 is a mechanism that includes a blowing unit 12 configured to blow air, and a heating unit 13 configured to heat air, and generates hot air. In the embodiment, the blowing unit 12 is an electric fan, and the heating unit 13 is a coil type electrothermal transducer. However, the blowing mechanism of the blowing unit 12 and the heat source of the heating unit 13 are not limited to them. In the embodiment, the heating unit 13 is arranged on the downstream side of the blowing unit 12 in the blowing direction, and heats air blown from the blowing unit 12. However, the heating unit 13 may be arranged on the upstream side of the blowing unit 12.

The passage forming unit 14 is a member that forms, between the hot air blowing unit 11 and a region R on the conveyance path (on RT0) of the conveying unit 6, a circulation path RT1 through which air blown from the hot air blowing unit 11 is circulated. The region R is a section of part of the conveyance path RT0 demarcated by the guide unit 9, and is a section facing the bottom of the drying device 10. The passage forming unit 14 includes a chamber 14*a* that incorporates the hot air blowing unit 11 and demarcates an internal space SP, partitions 14*b* formed inside the chamber 14*a*, a blow-off plate 14*c*, and a cover member 14*d*. The blow-off plate 14*c* is a perforated plate in which many holes are formed. The circulation path RT1 is demarcated by the chamber 14*a*, the partitions 14*b*, and the surface of the guide unit 9. Air blown from the blowing unit 12 is circulated from the heating unit 13 in the order of the blow-off plate 14*c*, the surface of the guide unit 9 or the printing medium P, and the blowing unit 12.

The circulation path RT1 has an introduction portion RTi to which air outside the circulation path (outside RT1) is introduced, and an exhaust portion RTo from which air inside the circulation path (inside RT1 indicated by a two-dot broken line) is exhausted. In other words, the chamber 14*a* forms, together with the guide unit 9, an airtight space excluding the introduction portion RTi and the exhaust portion RTo. The introduction portion RTi is an opening portion formed at the upstream end of the circulation path RT1 in the conveyance direction of the printing medium P. The exhaust portion RTo is an opening portion formed at the downstream end of the circulation path RT1 in the conveyance direction of the printing medium P.

Hot air is blown from the hot air blowing unit 11 through the blow-off plate 14*c* to the printing medium P conveyed on the guide unit 9. By blowing hot air toward the printing medium P, the temperatures of ink and the printing medium P rise, water and a solvent contained in the ink evaporate, and emulsion ink forms a film. Part of the hot air blown from the hot air blowing unit 11 forms a flow circulating through the circulation path RT1. Since the already heated hot air circulates, the power consumption of the heating unit 13 can be reduced.

The drying device 10 includes temperature sensors 15*a* to 15*c*. The temperature sensor 15*a* is arranged in the internal space SP, and especially on the downstream side of the heating unit 13 and the upstream side of the region R or blow-off plate 14*c* in the flow direction of the circulating flow within the circulation path RT1. The temperature sensor 15*a* can detect the temperature of hot air blown to the printing medium P. The temperature sensor 15*b* is arranged on the inner wall surface of the circulation path RT1 that is formed by the chamber 14*a*, and can detect the temperature of the inner wall surface. The temperature sensor 15*c* is arranged in the region R and can detect the temperature of the region R. The three temperature sensors 15*a* to 15*c* are provided and arranged at different positions in the embodiment, but one temperature sensor is sufficient.

The drying device 10 includes an adjusting unit 16. In regard to air flowing through the internal space SP, the adjusting unit 16 adjusts the ratio between inside air circulating through the circulation path RT1 and air outside the circulation path RT1 that is introduced into the circulation path RT1. In the embodiment, the adjusting unit 16 adjusts the amount of air outside the circulation path RT1 (outside the chamber 14*a*) that is supplied to the blowing unit 12. As a mode of adjustment, the adjusting unit 16 adjusts the exhaust amount of inside air of the circulation path RT1 that is exhausted from the circulation path RT1. The flow rate of inside air exhausted from the exhaust portion RTo is almost equal to that of outside air introduced from the introduction portion RTi. If the exhaust amount is increased, the introduction amount of outside air to the circulation path RT1 increases and the circulating air amount decreases. That is, the amount of outside air supplied to the blowing unit 12 increases. In contrast, if the exhaust amount is decreased, the introduction amount of outside air to the circulation path RT1 decreases, and the circulating air amount increases. That is, the amount of outside air supplied to the blowing unit 12 decreases.

In this way, the ratio between inside air circulating through the circulation path RT1 and air outside the circulation path RT1 that is introduced into the circulation path RT1 can be adjusted. The temperature of air in the internal space SP becomes relatively low at a high ratio of outside air, and relatively high at a low ratio of outside air. By adjustment of the adjusting unit 16, the increase and decrease of the temperature of air in the internal space SP can be controlled. The temperature of inside air of the drying device 10 can be adjusted in a shorter time.

The adjusting unit 16 according to the embodiment adjusts the exhaust amount by changing the opening amount of the exhaust portion RTo by the displacement of a movable member 16*a*. The movable member 16*a* is a plate-like flapper pivotally provided around a shaft CT in the X direction, and pivots by the driving force of an actuator (here, a motor) 16*c*.

The position of the movable member 16*a* is detected by a position detection sensor 16*d*. The position detection sensor 16*d* is, for example, a potentiometer or a rotary encoder that detects the pivot amount of the movable member 16*a*. The position of the movable member 16*a*, that is, the opening amount of the exhaust portion RTo can be controlled more accurately by controlling the actuator 16*c* based on the detection result of the position detection sensor 16*d*. It can also be controlled to decrease the temperature of hot air (decrease the heat generation amount of the heating unit 13) when a temperature of hot air set by the user is high, but the position detection sensor 16*d* detects that the opening amount of the exhaust portion RTo is small. Note that the position detection sensor 16*d* may be a microswitch that detects a position where an opening formed by the movable member 16*a* is large and a position where the opening is small.

The position of the movable member 16*a* is held by a holding unit 16*b*. The holding unit 16*b* is a lock mechanism that locks the position of the movable member 16*a* so as not to unnecessarily displace it. The holding unit 16*b* is, for example, a torque limiter provided on the shaft CT. When the driving force of the actuator 16*c* exceeds a predetermined torque of the torque limiter, the movable member 16*a* pivots. Even if an external force smaller than the predetermined torque acts on the movable member 16*a*, the position of the movable member 16*a* is held. The holding unit 16*b* can continuously maintain the position of the movable member 16*a*, that is, the opening amount of the exhaust portion RTo.

The cover member 14*d* covers the exhaust portion RTo, and has an opening through which exhausted air passes. The cover member 14*d* can prevent entrance of dust or the like into the circulation path RT1. In the embodiment, the cover member 14*d* covers even the movable member 16*a*. The cover member 14*d* can protect the movable member 16*a*.

Figure 2A:
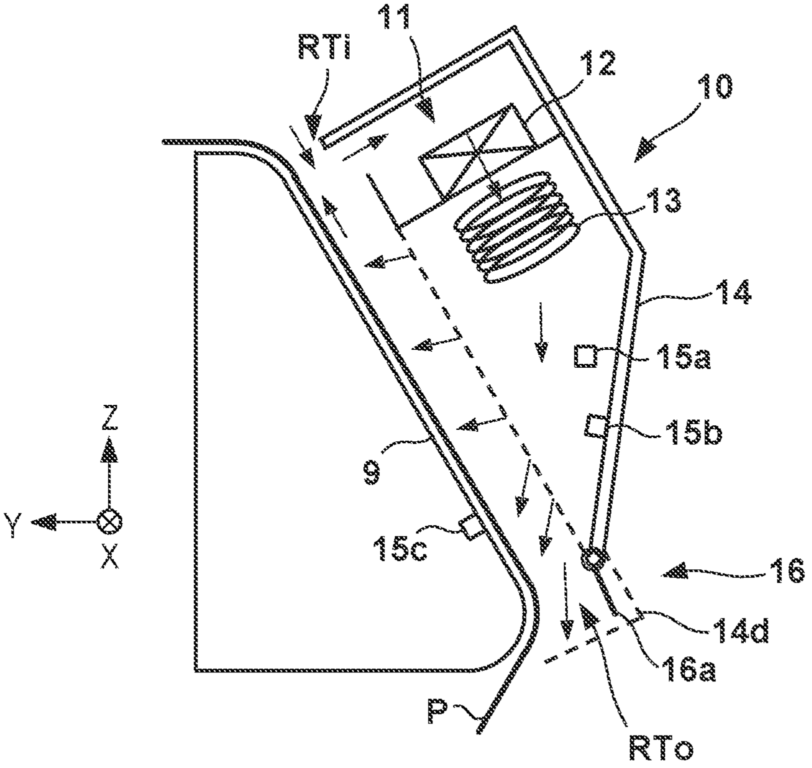
FIG. 2A is a view for explaining the operation of an adjusting unit.
Figure 2B:
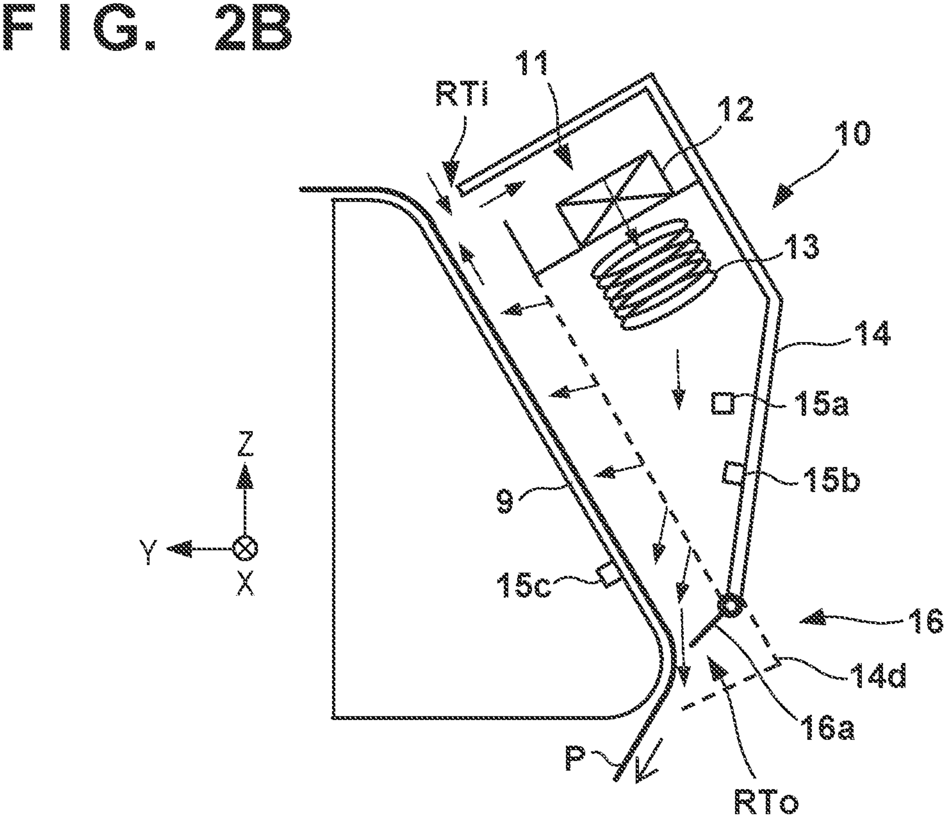
FIG. 2B is a view for explaining the operation of the adjusting unit.

FIGS. 2A and 2B are views for explaining the operation of the adjusting unit 16. FIG. 2A shows a state in which the movable member 16*a* is fully open, and the opening ratio of the exhaust portion RTo is 100%. When the opening ratio of the exhaust portion RTo is 100%, as shown in FIG. 2A, high-temperature inside air easily flows out, but the amount of outside air taken from the introduction portion RTi increases in proportion. As a result, the temperature of inside air of the drying device 10 can be quickly decreased. Note that the opening ratio here is 100% in the embodiment, but is not limited to this as long as the opening ratio is much higher than that in the fully closed state of the movable member 16*a* (to be described later).

The operation in FIG. 2A is advantageous when the temperature of inside air of the drying device 10 is decreased. At the time of replacing the printing medium P or maintenance such as jam processing, the drying device 10 is turned off to decrease the temperature for the convenience of user work. At this time, the movable member 16*a* is displaced in the open direction to widen the opening of the exhaust portion RTo, as shown in FIG. 2B. It is effective to rotate the blowing unit 12 especially at a higher speed. Power supply to the heating unit 13 is decreased, or supply of power is stopped. The circulation rate of hot air can be decreased to take a larger amount of outside air in the circulation path RT1, and quickly decrease the temperature of the whole drying device 10. As a result, the standby time until the user starts work can be shortened, improving the convenience.

The operation in FIG. 2A is also advantageous when the temperature setting of a new print job is lower than the current fixing condition. The temperature of the whole drying device 10 can be quickly decreased, and the time until a new print job is started can be shortened, improving the throughput.

FIG. 2B shows a state in which the movable member 16*a* is fully closed (initial state), and the opening ratio of the exhaust portion RTo is 10% or less. When the opening ratio of the exhaust portion RTo is 10% or less, as shown in FIG. 2B, low-temperature inside air hardly flows out, but the amount of outside air taken from the introduction portion RTi also decreases in proportion. The circulation rate of inside air can be increased to quickly increase the temperature of inside air by heating of the heating unit 13. Since inside air circulates and is repetitively heated by the heating unit 13, the power consumption of the heating unit 13 can be reduced. Note that the opening ratio is 10% in the embodiment, but is not limited to this. For example, as the flow rate of the blowing unit 12 is higher, the opening ratio needs to be lower.

The operation in FIG. 2B is suitable when the temperature of inside air is increased as in turning on the drying device 10. The opening of the exhaust portion RTo is narrowed by the movable member 16*a*, the blowing unit 12 is rotated, and power is supplied to the heating unit 13. Then, the circulation rate of hot air can be increased to quickly increase the temperature of the whole drying device 10 and obtain stable hot air in a short time. The standby time until ink is dried and fixed to the printing medium P after the start of printing can be shortened, implementing power reduction and high throughput.

The operation in FIG. 2B is also advantageous when the temperature setting of a new print job is higher than the current fixing condition. The temperature of the whole drying device 10 can be quickly increased, and the time until a new print job is started can be shortened, improving the throughput.

Note that the operations in FIGS. 2A and 2B can be performed until, for example, the detection result of the temperature sensor 15*a* represents a predetermined temperature. The detection result of the temperature sensor 15*b* or 15*c* may also be used as a criterion instead of the detection result of the temperature sensor 15*a* or as an additional condition. At the time of turning on the drying device 10, the temperature of the chamber 14*a* is in transition asymptotically to the temperature of hot air, and hot air heated by the heating unit 13 is cooled by the inner wall of the chamber 14*a*. Thus, the operation in FIG. 2B is continued until the detection result of the temperature sensor 15*b* provided on the inner wall of the chamber 14*a* exhibits a predetermined temperature. Accordingly, the temperature of the whole drying device 10 becomes steady, and more stable hot air can be supplied to the printing medium P. Whether the quantity of heat acting on the printing medium P satisfies an intended quantity of heat can be determined based on whether the detection result of the temperature sensor 15*c* represents a predetermined temperature. By using the detection result of the temperature sensor 15*c* as a criterion, an intended quantity of heat can be applied to the printing medium P.

<Control Circuit>

Figure 3:
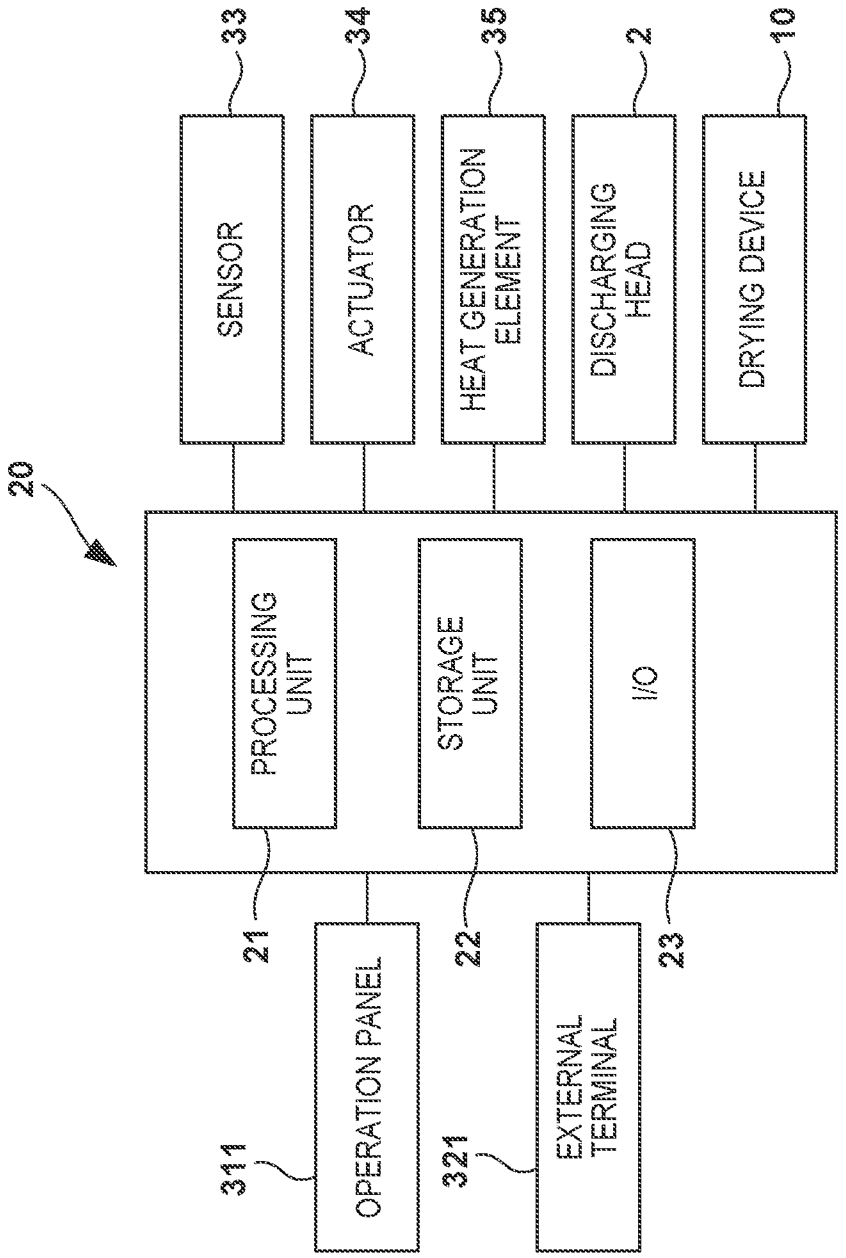
FIG. 3 is a block diagram of the control circuit of the printing apparatus in FIG. 1.

The arrangement of the control circuit of the printing apparatus 1 will be explained with reference to FIG. 3. The printing apparatus 1 includes the control unit 20 that controls the printing apparatus 1. The control unit 20 includes a processing unit 21, a storage unit 22, and an input/output interface (I/O) 23. The processing unit 21 is formed from one or more processors, and controls the printing apparatus 1 by executing a control program stored in the storage unit 22. More specifically, for example, the processing unit 21 obtains the detection result of a sensor 33 to perform driving control of an actuator 34, a heat generation element 35, the discharging head 2, and the drying device 10. The storage unit 22 is formed from one or more storage devices, and stores the control program and various data. The storage devices include semiconductor memories such as a RAM and a ROM, and a magnetic storage device such as a hard disk. The I/O 23 relays input/output of signals between the processing unit 21 and an external device.

An operation panel 311 is an input device that accepts an input from the user. The operation panel 311 may be a touch panel having a display function of providing information to the user. The user can set a temperature and amount of hot air in the drying device 10 by inputting them to the operation panel 311. The temperature of hot air may be set by input of the user. Alternatively, temperature information of hot air that is determined in advance in accordance with the type of the printing medium P may be stored in the storage unit 22, and a temperature corresponding to the type of the printing medium P used may be read out from the temperature information and set. An external terminal 321 is a host computer such as a personal computer, and transmits to the control unit 20 an image or the like to be printed on the printing medium P by the printing apparatus 1.

The sensor 33 includes various sensors (for example, the position detection sensor of the carriage 3 and the rotation amount sensor of the driving roller 6*a*). The actuator 34 includes the motor 6*c*, the driving motor of the blowing unit 81, and the driving motor of the driving mechanism 5. The heat generation element 35 includes each heat generation element of the heating unit 82.

The sensors of the drying device 10 include the temperature sensors 15*a* to 15*c*, and the position detection sensor 16*d*. The actuators of the drying device 10 include the actuator (motor) 16*c*, the driving motor of the blowing unit 12, and the heat generation element of the heating unit 13.

<Control Example of Drying Device>

Figure 4:
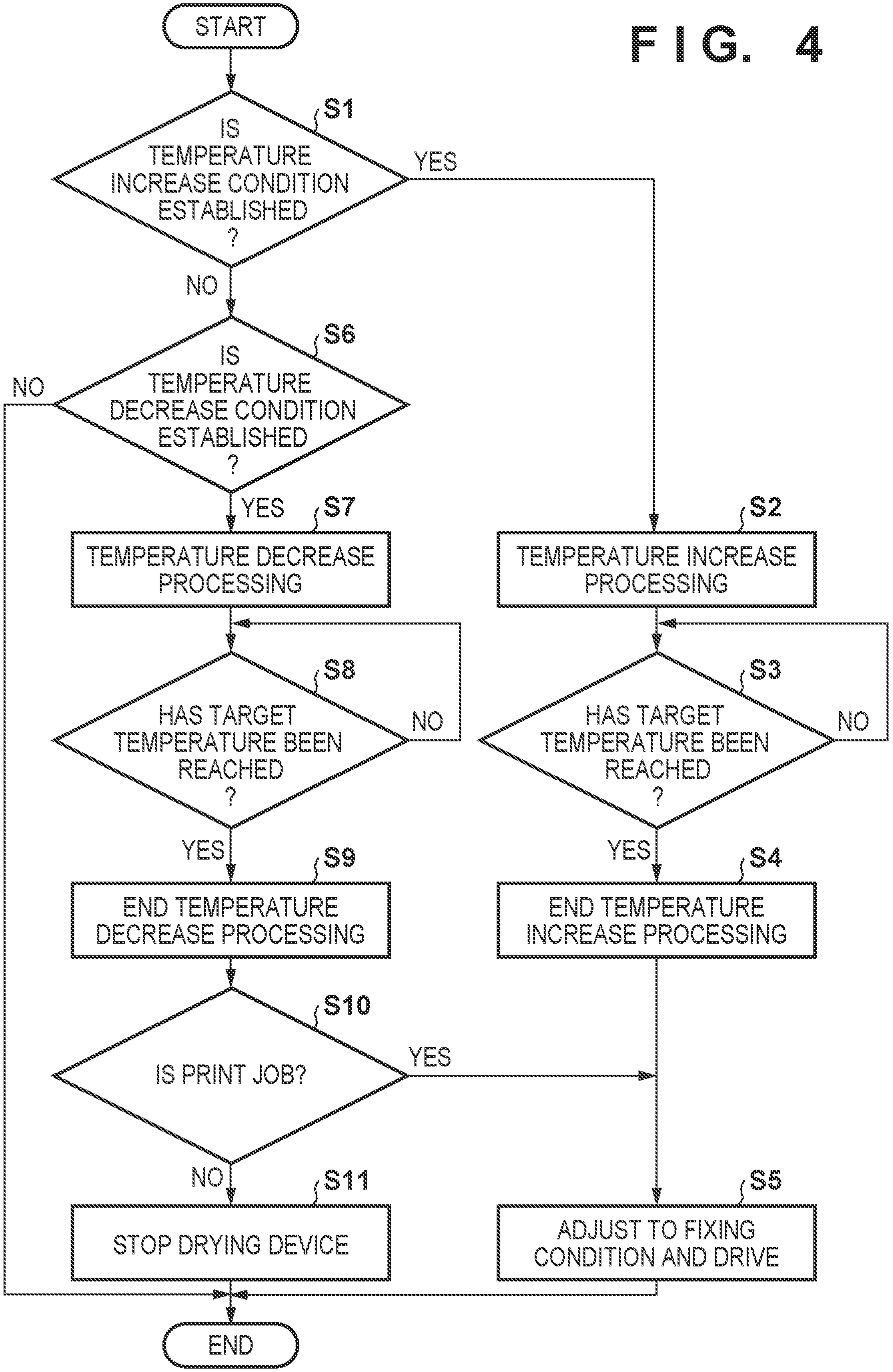
FIG. 4 is a flowchart showing a processing example of a control unit.

A control example of the drying device 10 will be explained. FIG. 4 is a flowchart showing a processing example of the control unit 20 regarding control of the drying device 10, and a flowchart especially showing a processing example when the temperature of inside air of the drying device 10 is changed.

In step S1, it is determined whether a temperature increase condition is established. If the temperature increase condition is established, the process advances to step S2; if NO, to step S6. The temperature increase condition can include a temperature increase instruction from the user. The temperature increase instruction from the user includes an ON operation to the drying device 10, an instruction to the operation panel 311, and an instruction from the external terminal 321. For each instruction, a target temperature is set. The instruction from the external terminal 321 includes an execution instruction to a print job (discharge operation instruction to the discharging head 2). When a print job designating drying at a temperature higher than the current temperature of hot air is received, the temperature increase condition is established. The temperature of hot air can be set in accordance with the type of the printing medium P.

In step S2, temperature increase processing is executed. Here, the drying device 10 is controlled to increase the ratio of inside air in the internal space SP. For example, the movable member 16*a* of the adjusting unit 16 is fully closed. The hot air blowing unit 11 is driven to increase the temperature of hot air blown from the hot air blowing unit 11. For example, the blowing unit 12 is driven to blow air, and power is supplied to the heating unit 13 to heat air from the blowing unit 12.

In step S3, it is determined whether the temperature of air in the internal space SP has reached a target temperature. If the temperature of air in the internal space SP has reached the target temperature, the process advances to step S5. This determination is made using the detection results of the temperature sensors 15*a* to 15*c*. The detection results used may be the detection results of all the sensors or the detection result of one of them. The target temperature may be equal or close to the temperature of hot air at the time of subsequent ink drying.

In step S4, the temperature increase processing ends, and the process advances to step S5. In step S5, the blowing unit 12 and the heating unit 13 are driven in accordance with the condition of subsequent ink drying. The movable member 16*a* of the adjusting unit 16 is maintained in the fully closed state, but may be displaced to a position set in accordance with the drying condition or the like.

In step S6, it is determined whether a temperature decrease condition is established. If the temperature decrease condition is established, the process advances to step S7; if NO, the processing in FIG. 4 ends. The temperature decrease condition can include a temperature decrease instruction from the user, and a condition based on the state of the printing apparatus 1. The temperature decrease instruction from the user includes an OFF operation to the drying device 10, an instruction to the operation panel 311, and an instruction from the external terminal 321. For each instruction, a target temperature is set. The instruction from the external terminal 321 includes an execution instruction to a print job (discharge operation instruction to the discharging head 2). When a print job designating drying at a temperature lower than the current temperature of hot air is received, the temperature decrease condition is established. The temperature of hot air can be set in accordance with the type of the printing medium P.

The condition based on the state of the printing apparatus 1 includes generation of maintenance. The generation of maintenance includes replacement work of the printing medium P, replacement work of the discharging head 2, and recovery work of an error (for example, cancellation work of a generated jam).

In step S7, temperature decrease processing is executed. Here, the drying device 10 is controlled to increase the ratio of outside air in the internal space SP. For example, the movable member 16*a* of the adjusting unit 16 is fully opened. The hot air blowing unit 11 is driven to decrease the temperature of hot air blown from the hot air blowing unit 11. For example, the blowing unit 12 is driven to blow air, and power supplied to the heating unit 13 is decreased or supply of power is stopped.

In step S8, it is determined whether the temperature of air in the internal space SP has reached a target temperature. If the temperature of air in the internal space SP has reached the target temperature, the process advances to step S9. This determination is made using the detection results of the temperature sensors 15*a* to 15*c*. The detection results used may be the detection results of all the sensors or the detection result of one of them. The target temperature may be set in accordance with the temperature decrease condition determined to be established in step S6. For example, in the OFF operation of the drying device 10, room temperature may be set as the target temperature. For example, in generation of maintenance, a temperature (from room temperature to almost the body temperature) at which the operator can work may be set as the target temperature. For example, in execution of a print job, the target temperature may be equal or close to the temperature of hot air at the time of ink drying in the print job.

In step S9, the temperature decrease processing ends, and the process advances to step S10. In step S10, it is determined whether the temperature decrease condition determined to be established in step S6 is for a new print job. If it is determined that the temperature decrease condition is for a new print job, the process advances to step S5, the blowing unit 12 and the heating unit 13 are driven in accordance with subsequent ink drying, and the position of the movable member 16*a* of the adjusting unit 16 is set. If it is determined that the temperature decrease condition is not for a new print job, the process advances to step S11 to stop the drying device 10.

As described above, according to the embodiment, the temperature of inside air of the drying device 10 can be adjusted in a shorter time by adjusting the ratio between inside air circulating through the circulation path RT1 by the adjusting unit 16 and outside air introduced into the circulation path RT1.

Second Embodiment

Figure 5:
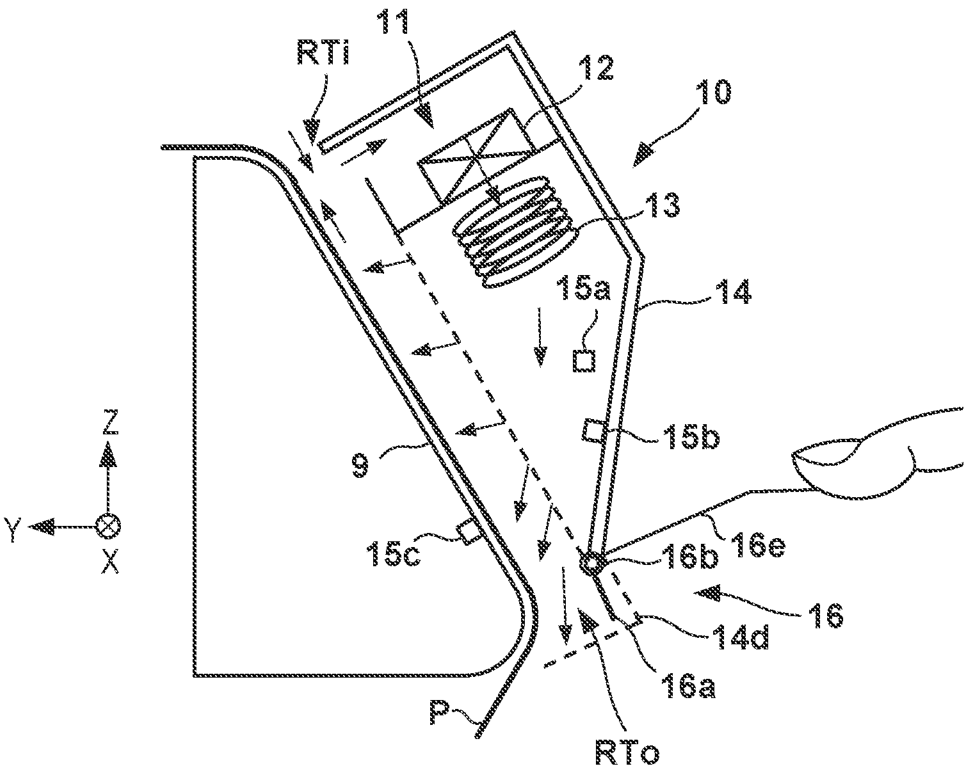
FIG. 5 is a view showing another arrangement example of a drying device.

The driving method of an adjusting unit 16 can be not electrical driving but manual driving. By manual driving, a printing apparatus can be manufactured at low cost, a motor or the like need not be provided, and a compact printing apparatus 1 can be implemented. FIG. 5 shows an example of this arrangement. In the example shown in FIG. 5, an operation member 16*e* is coupled to a movable member 16*a*, and the user can displace the movable member 16*a* by externally operating the operation member 16*e*. Neither an actuator 16*c* nor a sensor 16*d* is provided.

The user may determine establishment of a temperature increase condition or establishment of a temperature decrease condition, and operate the movable member 16*a*. Alternatively, a control unit 20 may inform the user via an operation panel 311 of establishment of a temperature increase condition or establishment of a temperature decrease condition, and prompt the user to operate the movable member 16*a*.

Note that both electrical driving and manual driving may be adopted as the driving method of the adjusting unit 16. In this case, the actuator 16*c* and the sensor 16*d* are provided in addition to the operation member 16*e*. Control of the adjusting unit 16 is basically automatic control, and the user may adjust the position of the movable member 16*a* by operating the operation member 16*e*, as needed.

Third Embodiment

Figure 6A:
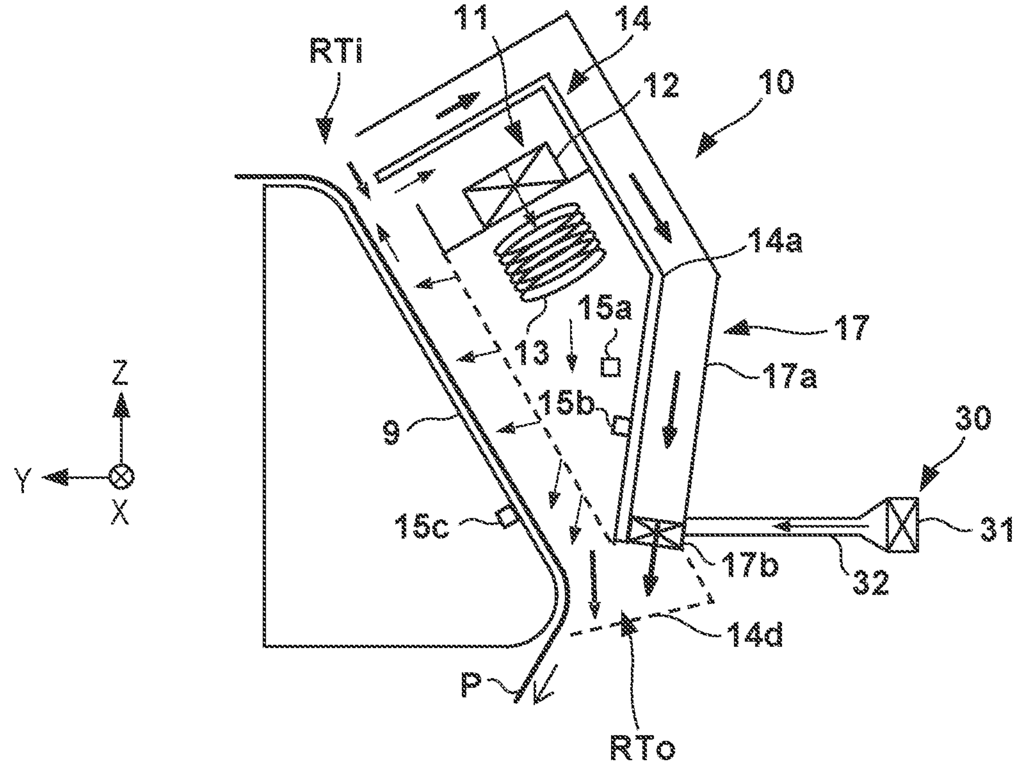
FIGS. 6A and 6B are views showing another arrangement example of the drying device.
Figure 6B:
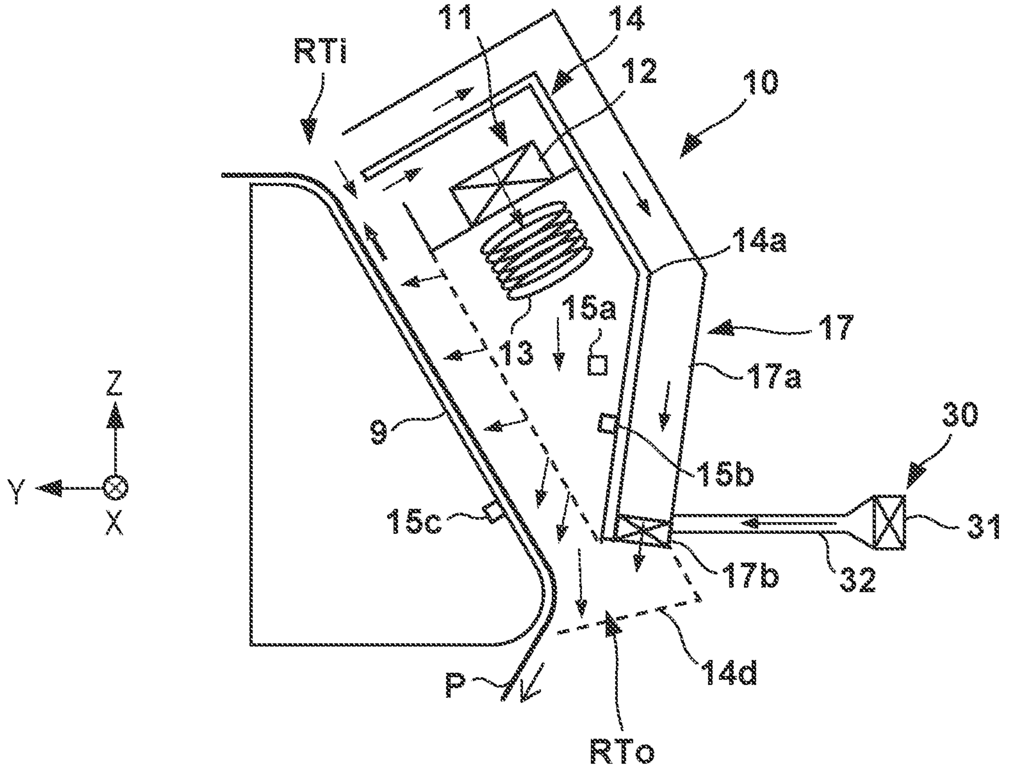

An adjusting unit 16 may be not a mechanism that changes the opening ratio of an exhaust portion RTo, like the first embodiment, but an external blowing mechanism that blows air in the exhaust direction of the exhaust portion RTo at a position adjacent to the exhaust portion RTo. FIGS. 6A and 6B show an example of this arrangement.

In the embodiment, an adjusting unit 17 is provided instead of the adjusting unit 16. The adjusting unit 17 is an external blowing mechanism (downflow unit) including a passage forming unit 17*a* and a blowing unit 17*b*. The passage forming unit 17*a* forms an air path having an inlet open at a portion adjacent to an introduction portion RTi, and an outlet open at a portion adjacent to the exhaust portion RTo. The blowing unit 17*b* is an electric fan that is arranged inside the air path and especially near the outlet of the air path, and blows air to the vicinity of the exhaust portion RTo in the exhaust direction of the exhaust portion RTo. The blowing unit 17*b* is covered with a cover member 14*d*.

A drying device 10 includes a cooling unit 30 that cools the adjusting unit 17. The cooling unit 30 includes a blowing unit 31, and a duct 32 that guides air blown from the blowing unit 31 to the blowing unit 17*b*. Outside air can be blown by the blowing unit 31 to the blowing unit 17*b* to cool the blowing unit 17*b*. Temperature rise of the blowing unit 17*b* by hot air exhausted from the exhaust portion RTo can be suppressed.

A control unit 20 can control the air amount of the blowing unit 17*b*. FIG. 6A shows a control example of the adjusting unit 17 in temperature decrease processing (step S7 in FIG. 4). The blowing unit 17*b* is driven to increase the flow rate (increase the rotational speed of the electric fan). If the flow rate of the blowing unit 17*b* is increased, hot air exhausted from the exhaust portion RTo is easily exhausted under the influence of the flow resistance of air from the blowing unit 17*b*. Resultantly, the amount of outside air taken into the introduction portion RTi can be increased to increase the ratio of outside air in an internal space SP and promote the decrease of the temperature of inside air of the drying device 10.

FIG. 6B shows a control example of the adjusting unit 17 in temperature increase processing (step S2 in FIG. 4). The blowing unit 17*b* is driven to decrease the flow rate (decrease the rotational speed of the electric fan). Hot air exhausted from the exhaust portion RTo is almost free from the influence of the flow resistance of air from the blowing unit 17*b* and is hardly exhausted. Thus, the amount of outside air taken into the introduction portion RTi can be decreased to increase the circulation rate of hot air and promote the increase of the temperature of inside air of the drying device 10.

Figure 7:
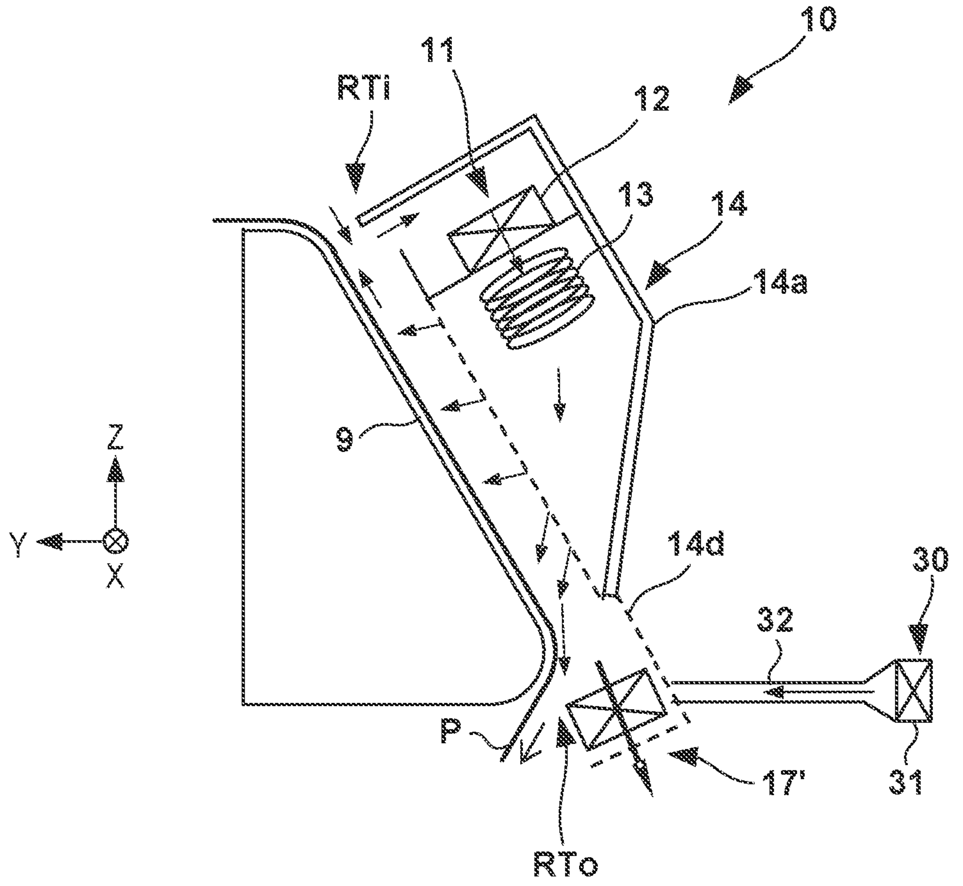
FIG. 7 is a view showing another arrangement example of the drying device.

An arrangement example in FIG. 7 can also be employed as another example of the external blowing mechanism that blows air in the exhaust direction of the exhaust portion RTo at a position adjacent to the exhaust portion RTo. An adjusting unit 17' is a blowing unit and an electric fan arranged on the downstream side of the exhaust portion RTo in the conveyance direction of a printing medium P, and is covered with the cover member 14*d*. In the example of FIG. 7, similar to the example of FIGS. 6A and 6B, the drying device 10 includes the cooling unit 30 that cools the adjusting unit 17'.

The exhaust direction of the adjusting unit 17' coincides with the exhaust direction of hot air from the exhaust portion RTo. When air is exhausted from the adjusting unit 17', a larger amount of hot air is exhausted from the exhaust portion RTo owing to the flow resistance, and a larger amount of outside air is taken into the introduction portion RTi.

The control unit 20 can control the flow rate of the adjusting unit 17'. In temperature decrease processing (step S7 in FIG. 4), the control unit 20 controls the flow rate to be high. Exhaust from the exhaust portion RTo is promoted to take a larger amount of outside air into the introduction portion RTi and decrease the temperature of inside air of the drying device 10. In temperature increase processing (step S2 in FIG. 4), the control unit 20 controls the flow rate to be low or stops the flow. Exhaust from the exhaust portion RTo is suppressed to decrease the amount of outside air taken into the introduction portion RTi, increase the circulation rate of hot air, and promote the increase of the temperature of inside air of the drying device 10.

Note that the adjusting units 17 and 17' according to the embodiment are configured to exhaust outside air. However, exhausted air may be, for example, air discharged from another place in a printing apparatus 1, or air (hot air) in the internal space SP.

Fourth Embodiment

Figure 8A:
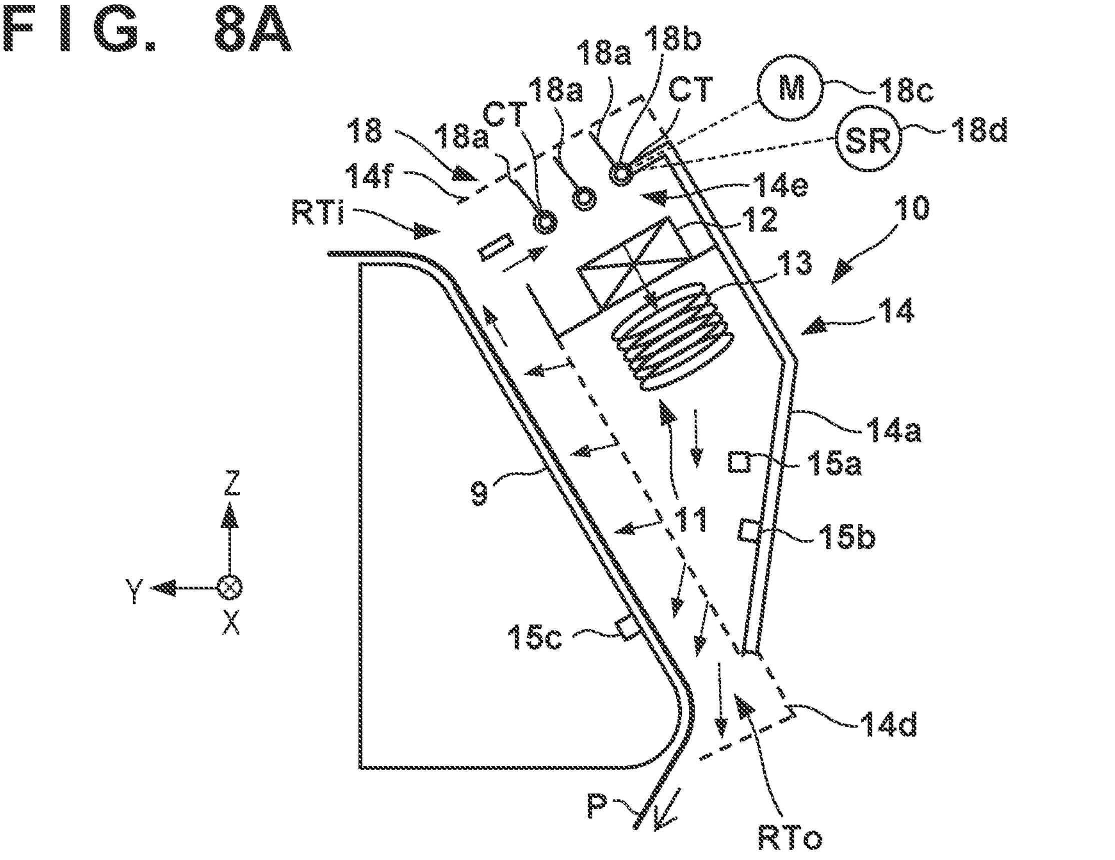
FIGS. 8A and 8B are views showing another arrangement example of the drying device.
Figure 8B:
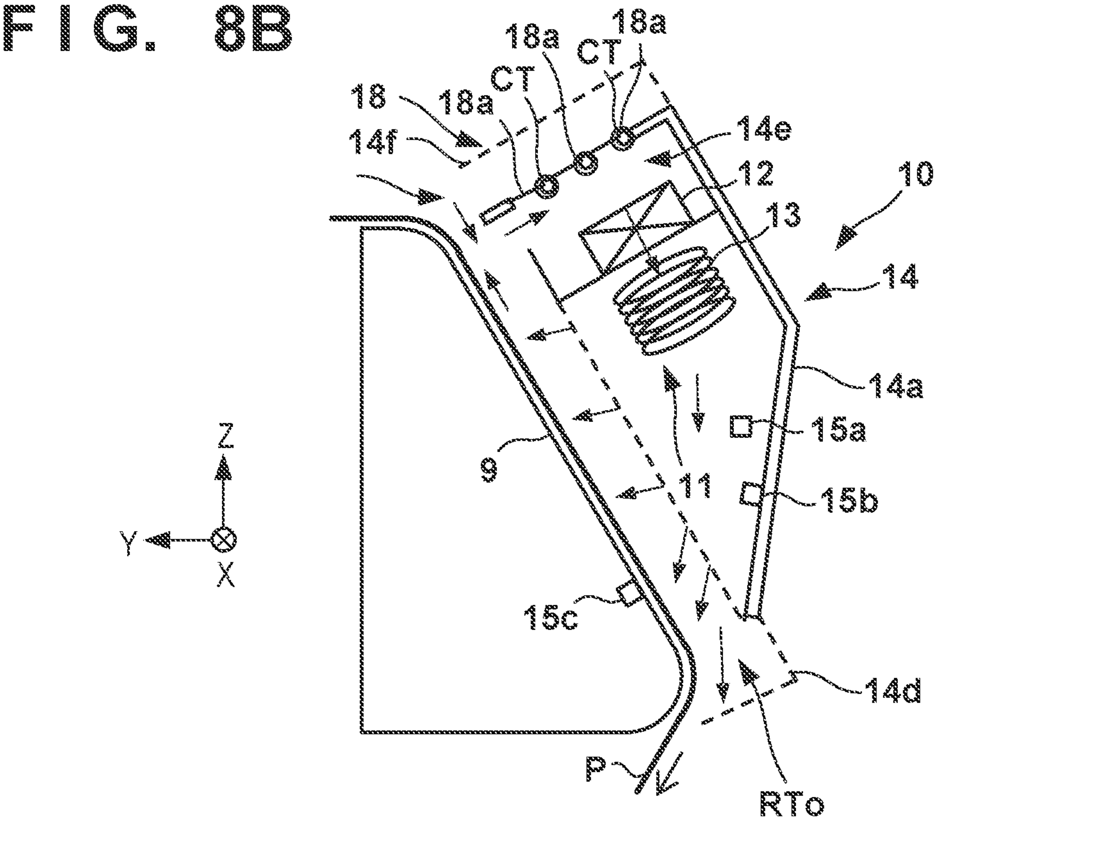

An adjusting unit may adjust the introduction amount of outside air to a circulation path RT1. FIGS. 8A and 8B show an example of this arrangement. In a passage forming unit 14 according to the embodiment, a chamber 14*a* has an opening portion 14*e*. The opening portion 14*e* is formed at an upstream-side portion of a blowing unit 12 on the downstream side of a region R or a blow-off plate 14*c* in the flow direction of a circulating flow. The opening portion 14*e* allows the circulation path RT1 to communicate with the outside.

An adjusting unit 18 includes movable members 18*a* that change the opening amount of the opening portion 14*e*. In the embodiment, a plurality of movable members 18*a* are provided and form a louver to open/close the opening portion 14*e*. Each movable member 18*a* is a plate-like flapper pivotally provided around a shaft CT in the X direction, and pivots by the driving force of an actuator (here, a motor) 18*c*. The position of the movable member 18*a* is detected by a position detection sensor 18*d*. The position detection sensor 18*d* is, for example, a potentiometer or a rotary encoder that detects the pivot amount of the movable member 18*a*. The position of the movable member 18*a*, that is, the opening amount of the opening portion 14*e* can be controlled more accurately by controlling the actuator 18*c* based on the detection result of the position detection sensor 18*d*. Alternatively, the position detection sensor 18*d* may be a microswitch that detects opening/closing by the movable member 18*a*. It can also be controlled to decrease the temperature of hot air (decrease the heat generation amount of a heating unit 13) when a temperature of hot air set by the user is high, but the position detection sensor 18*d* detects that the opening amount of the opening portion 14*e* is small.

The position of the movable member 18*a* is held by a holding unit 18*b*. The holding unit 18*b* is a lock mechanism that locks the position of the movable member 18*a* so as not to unnecessarily displace it. The holding unit 18*b* is, for example, a torque limiter provided on the shaft CT. When the driving force of the actuator 18*c* exceeds a predetermined torque of the torque limiter, the movable member 18*a* pivots. Even if an external force smaller than the predetermined torque acts on the movable member 18*a*, the position of the movable member 18*a* is held. The holding unit 18*b* can continuously maintain the position of the movable member 18*a*, that is, the opening amount of the opening portion 14*e*. The opening portion 14*e* is covered with a cover member 14*f* having an opening through which air can pass. The movable members 18*a* are also covered with the cover member 14*f*.

The control unit 20 can control the adjusting unit 18. In temperature decrease processing (step S7 in FIG. 4), each movable member 18*a* is displaced to increase the opening amount of the opening portion 14*e*. As an example of this state, FIG. 8A shows a state in which each movable member 18*a* is fully open, and the opening ratio of the opening portion 14*e* is 100%. When the opening ratio of the opening portion 14*e* is 100%, as shown in FIG. 8A, the ratio of outside air in the internal space SP can increase to promote the decrease of the temperature of inside air of the drying device 10. Note that the opening ratio is 100% in the embodiment, but is not limited to this and suffices to be much higher than that in the fully closed state of the opening portion 14*e* (to be described later).

In temperature increase processing (step S2 in FIG. 4), each movable member 18*a* is displaced to decrease the opening amount of the opening portion 14*e*. As an example of this state, FIG. 8B shows a state (initial state) in which each movable member 18*a* is fully closed, and the opening ratio of the opening portion 14*e* is 0%. When the opening ratio of the opening portion 14*e* is 0%, the circulation rate of inside air can be increased to promote the increase of the temperature of inside air of the drying device 10. In addition, the power consumption of the heating unit 13 can be reduced. Note that the opening ratio is 0% in the embodiment, but even if the opening portion 14*e* is slightly open, it can be regarded as substantially 0% as long as the opening portion 14*e* is narrow.

Even in the fourth embodiment, similar to the second embodiment, the movable member 18*a* may be manually displaced.

Although the opening portion 18*e* other than the introduction portion RTi is opened/closed in the embodiment, the introduction portion RTi may be opened/closed. In this case, the area of the flow channel of the introduction portion RTi may be adjusted by a valve or the like.

Fifth Embodiment

Figure 9A:
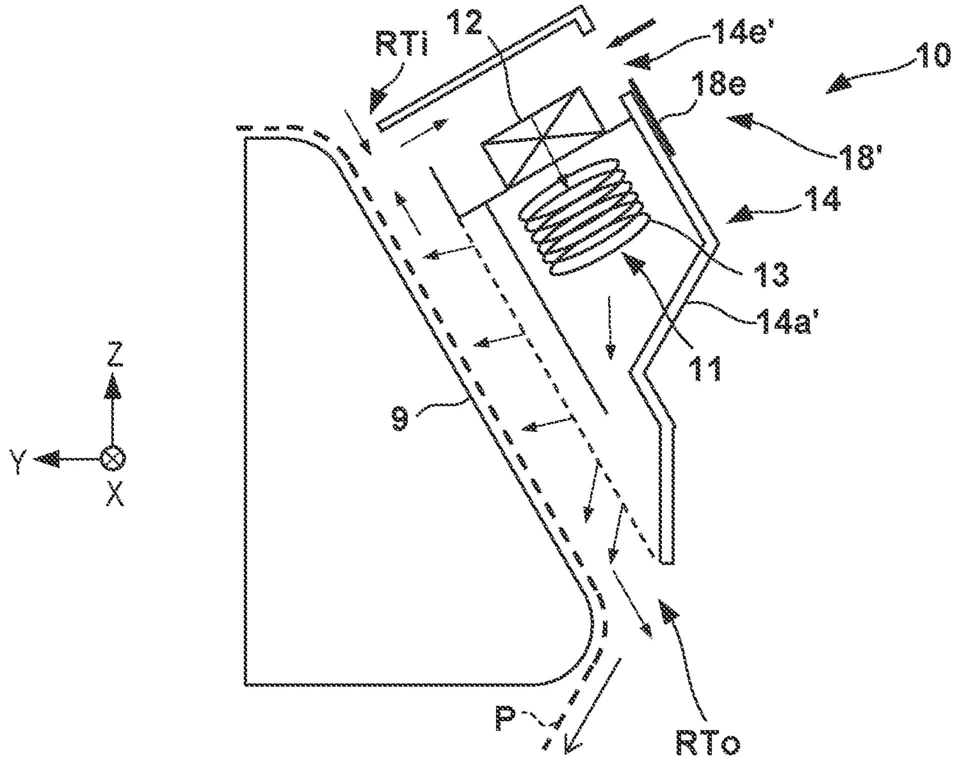
FIGS. 9A and 9B are views showing another arrangement example of the drying device.
Figure 9B:
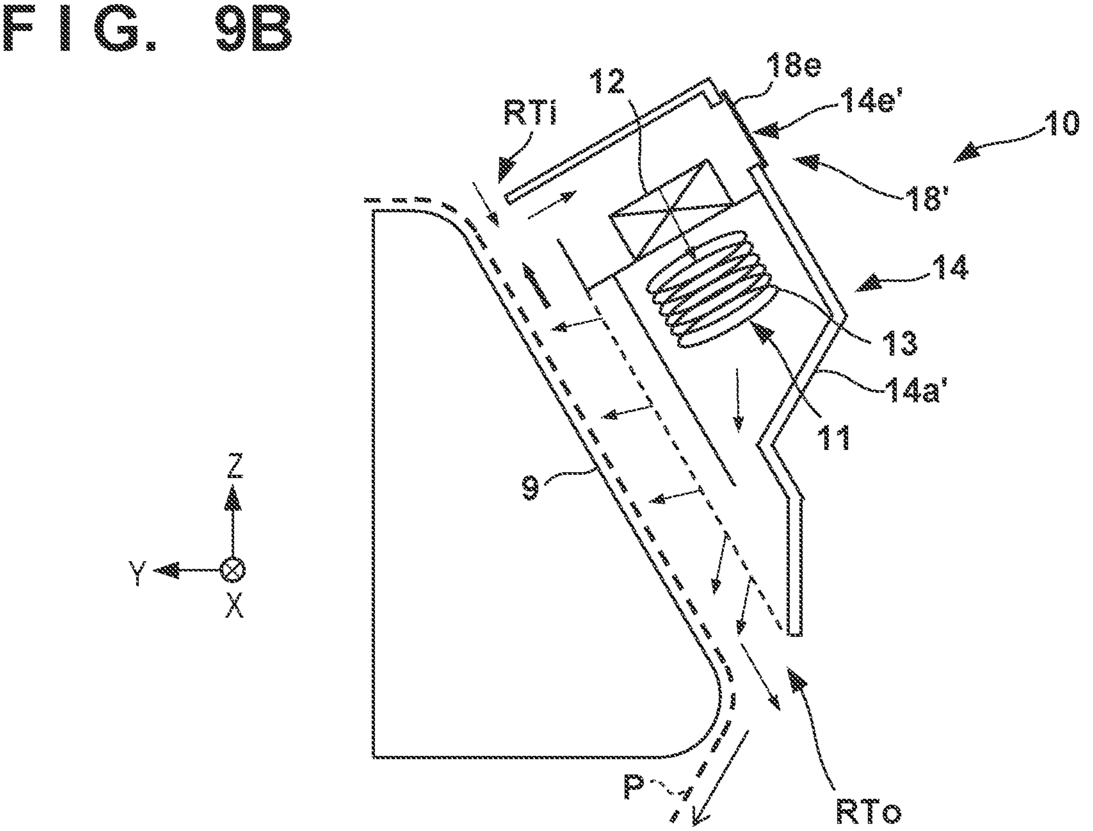

The movable members 16*a* and 18*a* are displaced by pivoting in the first and fourth embodiments, but may be displaced by translation. FIGS. 9A and 9B show an example of this arrangement. In a passage forming unit 14 according to the embodiment, a chamber 14*a* has an opening portion 14*e*'. The opening portion 14*e*' is formed at an upstream-side portion of a blowing unit 12 on the downstream side of a region R or a blow-off plate 14*c* in the flow direction of a circulating flow. The opening portion 14*e*' allows a circulation path RT1 to communicate with the outside.

An adjusting unit 18' includes a movable member 18*e* that changes the opening amount of the opening portion 14*e*'. The movable member 18*e* is a plate-like member provided to be translatable, and forms a shutter to open/close the opening portion 14*e*'. The movable member 18*e* may be displaced by an actuator such as a motor, and a sensor that detects the position of the movable member 18*e* may be provided.

A control unit 20 can control the adjusting unit 18'. In temperature decrease processing (step S7 in FIG. 4), the control unit 20 displaces the movable member 18*e* to increase the opening amount of the opening portion 14*e*'. As an example of this state, FIG. 9A shows a state in which the movable member 18*e* is almost fully open, and the opening ratio of the opening portion 14*e*' is 90 or more. When the opening ratio of the opening portion 14*e*' is high, the ratio of outside air in an internal space SP can increase to promote the decrease of the temperature of inside air of the drying device 10. Note that the opening ratio is 90% in the embodiment, but is not limited to this and suffices to be much higher than that in the fully closed state of the opening portion 14*e*' (to be described later).

In temperature increase processing (step S2 in FIG. 4), each movable member 18*e* is displaced to decrease the opening amount of the opening portion 14*e*'. As an example of this state, FIG. 9B shows a state (initial state) in which the movable member 18*e* is fully closed, and the opening ratio of the opening portion 14*e*' is 0%. When the opening ratio of the opening portion 14*e*' is 0%, the circulation rate of inside air can be increased to promote the increase of the temperature of inside air of the drying device 10. Further, the power consumption of a heating unit 13 can be reduced. Note that the opening ratio is 0% in the embodiment, but even if the opening portion 14*e*' is slightly open, it can be regarded as substantially 0% as long as the opening portion 14*e*' is narrow.

Even in the fifth embodiment, similar to the second embodiment, the movable member 18*e* may be manually displaced. Also, a holding unit that holds the position of the movable member 18*e* may be provided. A movable member that is displaced by translation, as in the fifth embodiment, may be adopted as a movable member that adjusts the exhaust amount of an exhaust portion RTo, as in the first embodiment.

Sixth Embodiment

Figure 10A:
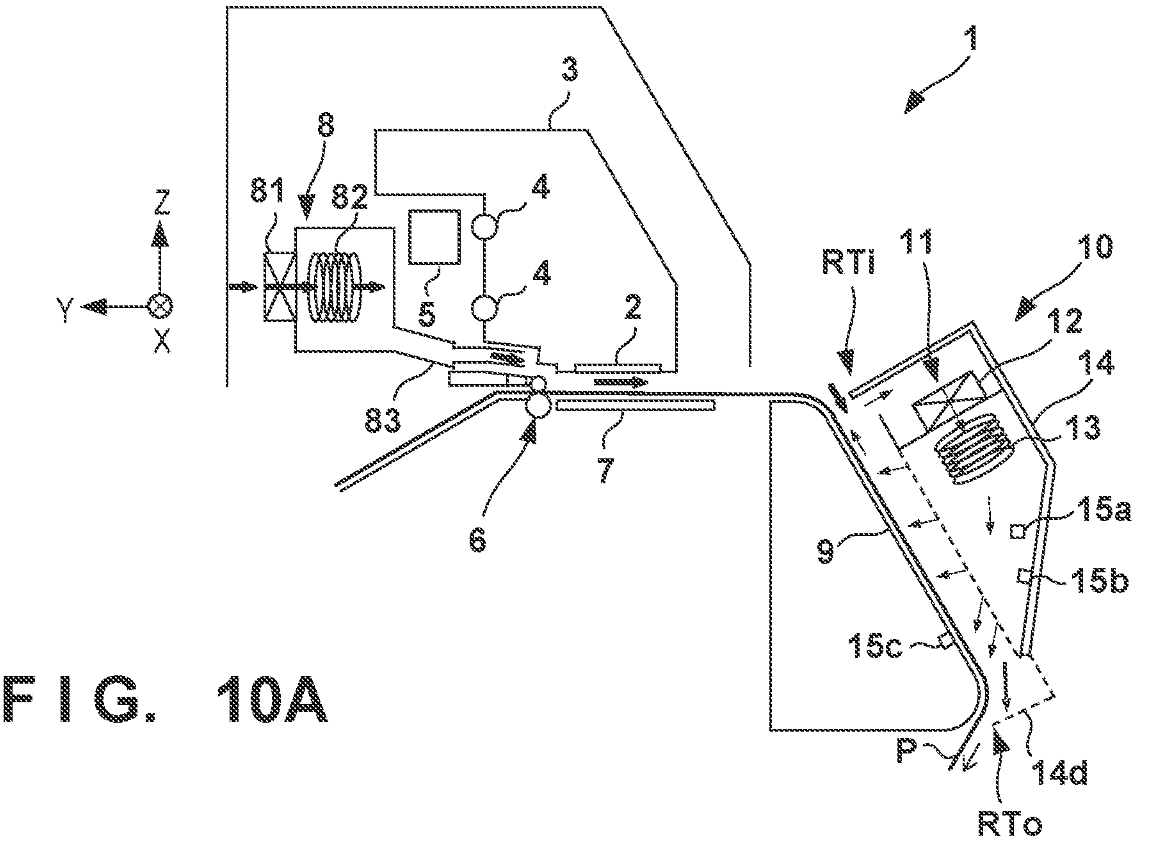
FIGS. 10A and 10B are views showing another arrangement example of the drying device.
Figure 10B:
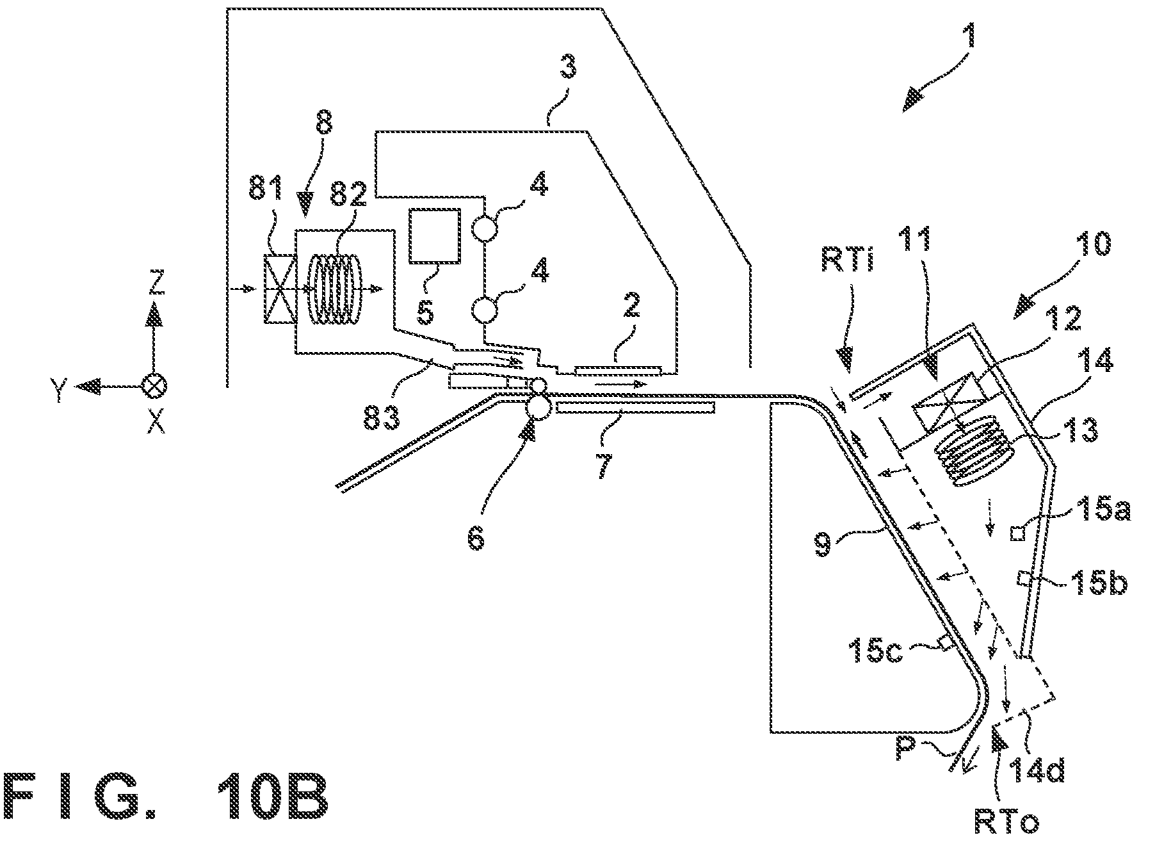

A hot air blowing device 8 may also be used as the adjusting unit of a drying device 10. FIGS. 10A and 10B are views for explaining this arrangement. When a blowing unit 81 of the hot air blowing device 8 is driven, blown air passes through a platen 7 and a discharging head 2 and reaches an introduction portion RTi. That is, the blowing unit 81 can be used as an external blowing unit that blows air toward the introduction portion RTi. At this time, the heat generation amount of a heating unit 82 as an external heating unit can be adjusted to adjust the temperature of air blown to the introduction portion RTi.

In temperature decrease processing (step S7 in FIG. 4), the air amount of the blowing unit 81 is relatively increased (electric fan is driven at a high rotational speed) to relatively decrease power supply of the heating unit 82 or stop supply of power. FIG. 10A shows an example of this state. The ratio of outside air flowing into a blowing unit 12 can be increased by blowing air from the blowing unit 81 of the hot air blowing device 8 to the introduction portion RTi. The heating unit 82 stops heat generation. The ratio of outside air in an internal space SP can increase to promote the decrease of the temperature of inside air of the drying device 10.

In temperature increase processing (step S2 in FIG. 4), the air amount of the blowing unit 81 is relatively decreased (electric fan is driven at a low rotational speed) to relatively increase power supply of the heating unit 82. FIG. 10B shows an example of this state. The flow rate of air blown from the blowing unit 81 of the hot air blowing device 8 to the introduction portion RTi is decreased. The intake amount of outside air at the introduction portion RTi decreases, the amount of inside air exhausted from an exhaust portion RTo decreases, and the circulation rate of inside air increases. The increase of the temperature of inside air of the drying device 10 can be promoted. Also, the power consumption of a heating unit 13 can be reduced.

In this manner, the hot air blowing device 8 can be exploited as an adjusting unit to adjust the temperature of inside air of the drying device 10, obtaining effects similar to those in the first embodiment.

The adjusting unit (hot air blowing device 8) according to the sixth embodiment can also be used together with the adjusting unit according to each of the second to fifth embodiments.

Figure 11:
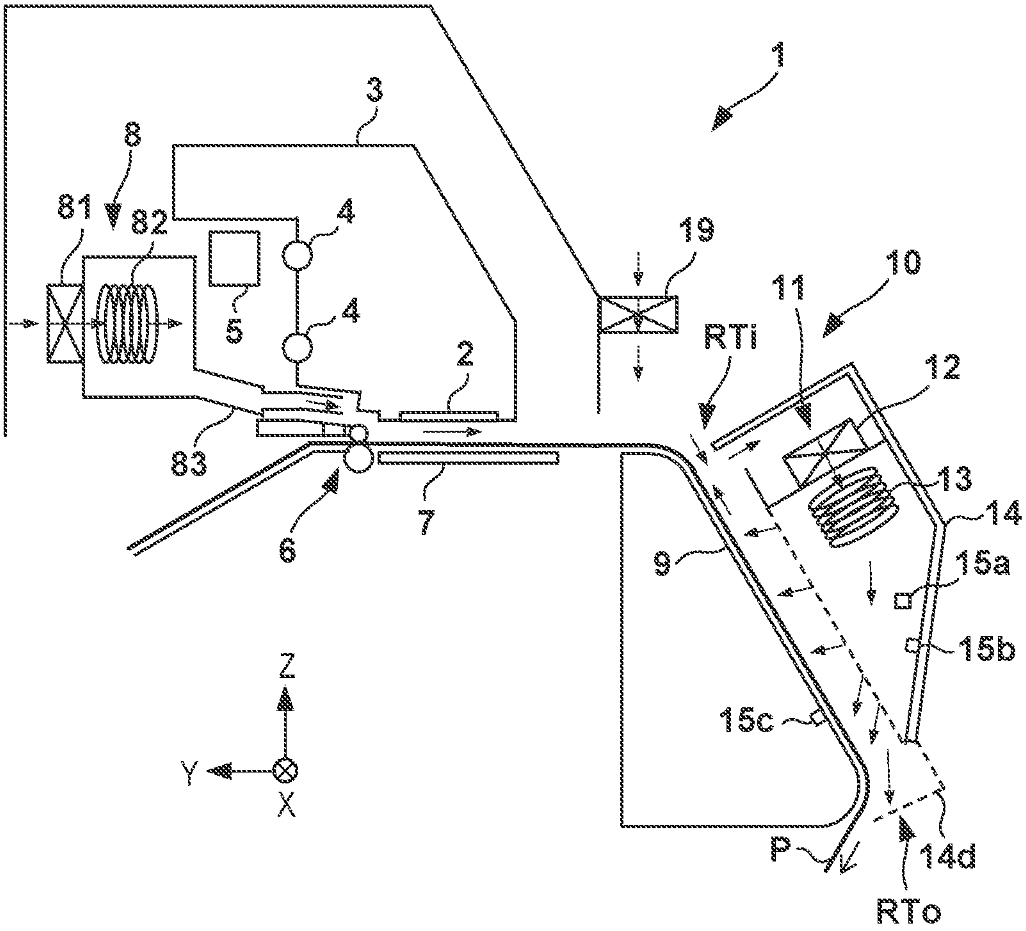
FIG. 11 is a view showing another arrangement example of the drying device.

As an external blowing unit, an arrangement in FIG. 11 is also applicable. In the example shown in FIG. 11, an air curtain fan 19 that blows air to a printing medium P is provided at a portion between a carriage 3 and the drying device 10. The air curtain fan 19 can be provided to reduce intake of an ink mist not reaching the printing medium P but floating into the drying device 10. In temperature decrease processing (step S7 in FIG. 4), the air curtain fan 19 is driven to blow air to the introduction portion RTi. The ratio of outside air flowing into the blowing unit 12 can be increased to promote the decrease of the temperature. In temperature increase processing (step S2 in FIG. 4), the flow rate of the air curtain fan 19 is decreased or the air curtain fan 19 is stopped. The circulation rate of inside air of the drying device 10 can be increased to promote the increase of the temperature.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-039883, filed Mar. 14, 2023, which is hereby incorporated by reference herein in its entirety.

What is claimed is:

1. A drying device comprising:

a conveying unit configured to convey a medium to which a liquid is discharged from a discharging head;

a hot air blowing unit including a blowing unit configured to blow air, and a heating unit configured to heat air;

a passage forming unit configured to form, between the hot air blowing unit and a region on a conveyance path of the conveying unit, a circulation path through which air blown from the hot air blowing unit is to be circulated;

an adjusting unit configured to adjust a ratio between inside air circulating through the circulation path and outside air, outside the circulation path, that is introduced into the circulation path; and a control unit configured to control the adjusting unit, wherein, if a temperature increase instruction from a user is received through an input device, the control unit controls the adjusting unit to increase a ratio of the inside air, and if a temperature decrease instruction from a user is received through the input device, the control unit controls the adjusting unit to increase a ratio of the outside air.

2. The drying device according to claim 1, wherein, if the temperature decrease instruction is received, the control unit controls the hot air blowing unit to decrease a temperature of air blown from the hot air blowing unit, and if the temperature increase instruction is received, the control unit controls the hot air blowing unit to increase the temperature of air blown from the hot air blowing unit.

3. The drying device according to claim 1, wherein the adjusting unit is configured to adjust at least one of an introduction amount of the outside air and an exhaust amount of the inside air to outside the circulation path.

4. The drying device according to claim 1, wherein the circulation path includes an introduction portion configured to introduce outside air outside the circulation path, and an exhaust portion configured to exhaust inside air inside the circulation path, and wherein the adjusting unit is configured to adjust an exhaust amount at the exhaust portion.

5. The drying device according to claim 1, wherein the circulation path includes an introduction portion configured to introduce outside air outside the circulation path, and an exhaust portion configured to exhaust inside air inside the circulation path, and wherein the adjusting unit includes a movable member configured to change an opening amount of the exhaust portion.

6. The drying device according to claim 1, wherein the circulation path includes an introduction portion configured to introduce outside air outside the circulation path, and an exhaust portion configured to exhaust inside air inside the circulation path, and wherein the adjusting unit includes a blowing unit configured to blow air in an exhaust direction of the exhaust portion at a position adjacent to the exhaust portion.

7. The drying device according to claim 1, wherein the passage forming unit has an opening portion configured to allow the circulation path to communicate with an outside, and the adjusting unit includes a movable member configured to change an opening amount of the opening portion.

8. The drying device according to claim 1, wherein the circulation path includes an introduction portion configured to introduce outside air outside the circulation path, and an exhaust portion configured to exhaust inside air inside the circulation path, and wherein the adjusting unit includes an external blowing unit disposed outside the passage forming unit and configured to blow air toward the introduction portion.

9. The drying device according to claim 1, wherein the circulation path includes an introduction portion configured to introduce outside air outside the circulation path, and an exhaust portion configured to exhaust inside air inside the circulation path, and wherein the adjusting unit includes an external blowing unit disposed outside the passage forming unit and configured to blow air toward the introduction portion through a region where the discharging head discharges the liquid to the medium, and further includes an external heating unit disposed outside the passage forming unit and configured to heat air blown from the external blowing unit at a position on a side of the blowing unit with respect to the region on the conveyance path.

10. The drying device according to claim 1, further comprising a temperature sensor configured to detect a temperature of air inside the circulation path, wherein the control unit is configured to control the adjusting unit based on a detection result of the temperature sensor.

11. The drying device according to claim 1, further comprising a temperature sensor configured to detect a temperature of an inner wall surface of the circulation path, wherein the control unit is configured to control the adjusting unit based on a detection result of the temperature sensor.

12. The drying device according to claim 1, further comprising a temperature sensor configured to detect a temperature of the region on the conveyance path, wherein the control unit is configured to control the adjusting unit based on a detection result of the temperature sensor.

13. A printing apparatus comprising:

a conveying unit configured to convey a medium to which a liquid is discharged from a discharging head;

a hot air blowing unit including a blowing unit configured to blow air, and a heating unit configured to heat air;

a passage forming unit configured to form, between the hot air blowing unit and a region on a conveyance path of the conveying unit, a circulation path through which air blown from the hot air blowing unit is to be circulated;

an adjusting unit configured to adjust a ratio between inside air circulating through the circulation path and outside air, outside the circulation path, that is introduced into the circulation path; and a control unit configured to control the adjusting unit, wherein, if a temperature increase instruction from a user is received through an input device, the control unit controls the adjusting unit to increase a ratio of the inside air, and if a temperature decrease instruction from a user is received through the input device, the control unit controls the adjusting unit to increase a ratio of the outside air.

14. The printing apparatus according to claim 13, wherein the input device is an operation panel provided on the printing apparatus.

15. The printing apparatus according to claim 13, wherein the input device is an external terminal disposed outside the printing apparatus and connected to the printing apparatus.

* * * * *